(12) United States Patent
Han et al.

(10) Patent No.: US 10,932,157 B2
(45) Date of Patent: Feb. 23, 2021

(54) INTELLIGENT LINK AGGREGATION

(71) Applicant: HEWLETT PACKARD ENTERPRISE DEVELOPMENT LP, Houston, TX (US)

(72) Inventors: Jianpo Han, Beijing (CN); Xuefu Wang, Beijing (CN); Qiang Zhou, Beijing (CN); Guangzhi Ran, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 82 days.

(21) Appl. No.: 16/225,364

(22) Filed: Dec. 19, 2018

(65) Prior Publication Data
US 2020/0205035 A1 Jun. 25, 2020

(51) Int. Cl.
| | |
|---|---|
| H04W 28/08 | (2009.01) |
| H04W 28/02 | (2009.01) |
| H04W 92/20 | (2009.01) |
| H04W 92/04 | (2009.01) |

(52) U.S. Cl.
CPC ..... *H04W 28/085* (2013.01); *H04W 28/0236* (2013.01); *H04W 28/0284* (2013.01); *H04W 92/045* (2013.01); *H04W 92/20* (2013.01)

(58) Field of Classification Search
CPC .......... H04J 14/0267; H04J 2203/0023; H04J 2203/0053; H04L 45/00; H04L 45/10; H04L 45/22; H04L 49/256; H04L 49/25; H04M 2215/42; H04W 40/00; H04W 40/02

USPC ........................................................ 370/351
See application file for complete search history.

(56) References Cited

U.S. PATENT DOCUMENTS

| | | |
|---|---|---|
| 9,439,099 B2 | 9/2016 | Emmanuel et al. |
| 9,819,595 B2 | 11/2017 | Cioffi et al. |
| 9,930,713 B2 | 3/2018 | Cariou et al. |

(Continued)

OTHER PUBLICATIONS

Bensimhon, D., Why Should 5GHz & 60GHz Team Up? It's all about the Customer Experience, (Web Page), Sep. 26, 2016, 4 Pgs.

(Continued)

*Primary Examiner* — Robert J Lopata
(74) *Attorney, Agent, or Firm* — Nolte Lackenback Siegel

(57) ABSTRACT

Techniques and systems perform link aggregation and fault tolerance across a wireless link connecting two wired networks. In a first example, a wireless networking device includes first radio and a second radio communicatively coupled to a wired network communication interface. The first and second radios have different operational parameters for bandwidth of transmission and other factors. The wireless networking device may include a processing device to cause the wireless networking device to establish a single data communication channel via the first radio; determine throughput of communication has been affected by an impact condition causing communication via the first radio to be impacted negatively and the second radio impacted positively. Based on that determination the single data communication channel may be transitioned to be received via the second radio. Each radio may maintain an active/backup status or perform load balancing to provide transmission of the single data communication channel.

17 Claims, 14 Drawing Sheets

(56) References Cited

U.S. PATENT DOCUMENTS

| | | | | |
|---|---|---|---|---|
| 2004/0106412 | A1* | 6/2004 | Laroia | H04W 16/12 455/448 |
| 2006/0193295 | A1* | 8/2006 | White | H04L 12/5692 370/336 |
| 2008/0002652 | A1* | 1/2008 | Gupta | H04L 25/03834 370/338 |
| 2008/0207200 | A1* | 8/2008 | Fein | H04B 1/38 455/426.1 |
| 2008/0232383 | A1* | 9/2008 | Meier | H04L 45/48 370/401 |
| 2008/0259888 | A1* | 10/2008 | Terashima | H04L 12/2832 370/338 |
| 2008/0291826 | A1* | 11/2008 | Licardie | H04L 47/30 370/230 |
| 2011/0134894 | A1* | 6/2011 | Stacey | H04L 69/14 370/338 |
| 2011/0182289 | A1* | 7/2011 | Raman | H04L 12/66 370/356 |
| 2014/0160939 | A1* | 6/2014 | Arad | H04L 45/306 370/237 |
| 2016/0315687 | A1* | 10/2016 | Jeanne | H04B 7/14 |
| 2018/0234494 | A1* | 8/2018 | Klemets | H04L 67/141 |

OTHER PUBLICATIONS

Collaboration between 2.4/5 and 60 GHz, (PowerPoint Presentation), May 2010, 19 Pgs.

Zhou, P. et al., IEEE 802.11ay based mmWave WLANs: Design Challenges and Solutions, (Research Paper), Mar. 21, 2018, vol. 20, No. 20, 27 Pgs.

* cited by examiner

INTELLIGENT LINK AGGREGATION

BACKGROUND

Computer networks of some form are commonly installed in buildings where computers need to communicate with each other, shared services offered within the organization, or even access public information available on the Internet. The complexity of the network installation may be determined by the needs of the organization that manages the network. These networks often have a combination of hardwired and wireless connections where each device on the network uses one method to maintain a connection to the network. Network installations such as these clearly work well when all devices are physically located within a reasonable radius of each other. Once the radius expands beyond adjacent buildings or even across the street, physical and wireless connections become more infeasible to maintain as the distance increases. Organizations that have multiple geographically distributed locations may connect several small individual networks together utilizing techniques such as point-to-point VPN over the public Internet. The organization's complete network may therefore be composed of many of these small individual networks, known as sub-nets, connected together using various point-to-point connection techniques. Some of these point-to-point techniques come with expenses such as maintaining an Internet connection and a device that implements the VPN at each point in the point-to-point VPN tunnel. While this is clearly more cost effective than running a physical cable between two points separated by a very large distance, it is not very cost effective for connecting two sub-nets that are merely meters apart.

Wireless network connections typically can be used to connect network devices over a short distance. The use of wireless networking is common to connect smart-phones, laptops, tablets, and other computing devices to a local area network. Wireless networking can be utilized to implement a point-to-point connection over short distances to allow the connection of two network sub-nets. Using wireless networking, however, is not without some technical limitations; wireless networking utilizes radio waves to communicate, and radio waves are subject to interference which could cause communication disruption. To receive a radio signal, for example, the signal should have enough power at broadcast to be clearly received by the receiver of the signal. The signal power may be attenuated (e.g. reduced) due to distance and atmospheric conditions, which may cause a remote receiver to be unable to receive the radio broadcast.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not be implemented with serial processing and therefore may be performed in an order different than shown or possibly in parallel with each other. For a detailed description of various examples, reference will now be made to the accompanying drawings, in which.

DETAILED DESCRIPTION

Figure 1A:
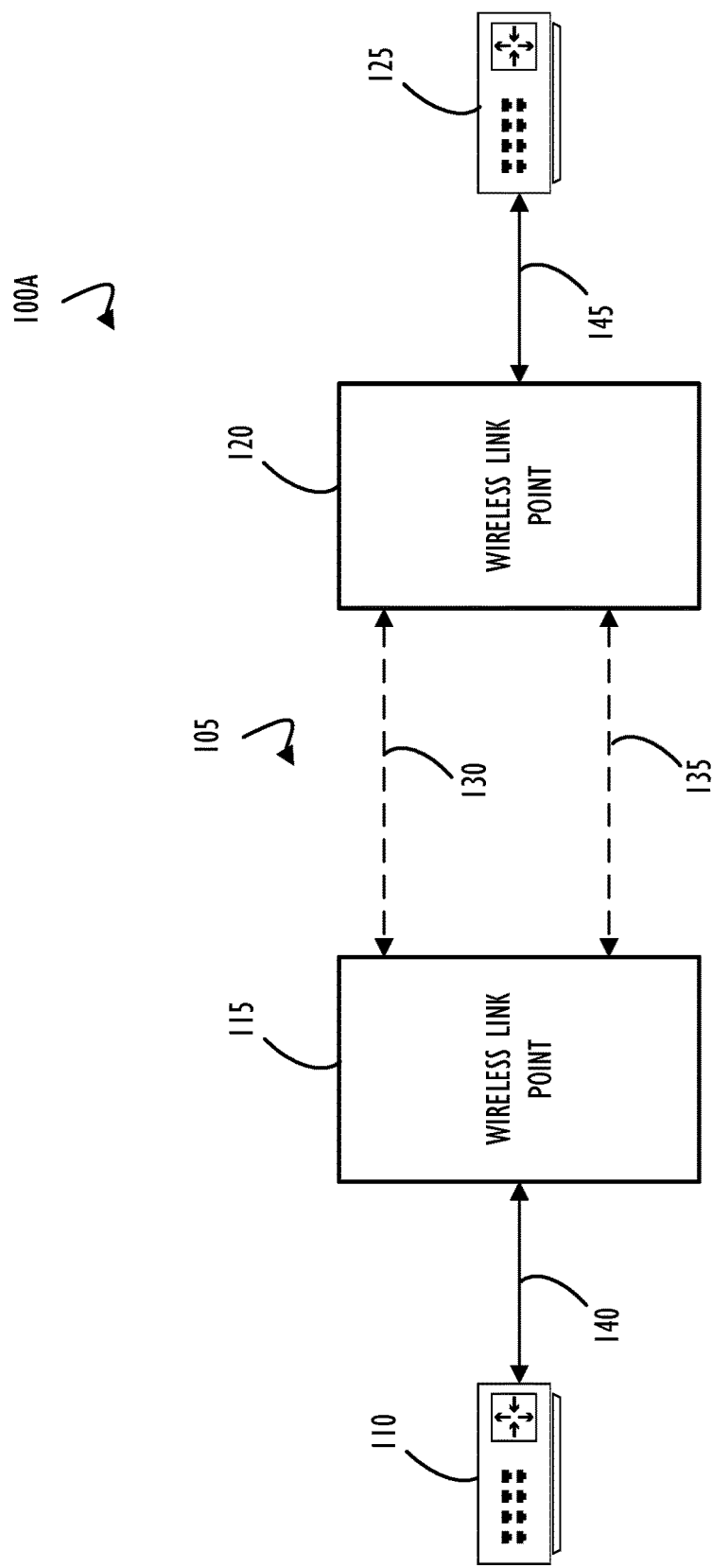
FIG. 1A is a functional block diagram representing an example of two wireless link devices utilizing two wireless network communication radios to bridge communication between two network sub-nets, according to one or more disclosed implementations.

Examples of the subject matter claimed below will now be disclosed. In the interest of clarity, not all features of an actual implementation are described in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The interference with radio reception is sometimes impacted by electrical processes that take place continually in the earth's atmosphere. Every irregular change (discharges and such) in atmospheric electricity causes electromagnetic waves of all possible wavelengths to be radiated which act on the antennas of radio receivers, producing, at the output. noise and crackles (in a loudspeaker), streaks, dashes (on a kinescope), and so on. The level of the interference picked up by an antenna may be affected by the distance and conditions for radio wave propagation (at a given time of day and year) between the point of the waves' origin and the receiver location. Atmospheric interference is generally more noticeable at the long and medium wavelengths of the radio broadcasting range; upon shifting to short wavelengths, the interference may be diminished. Stronger interference may be created by lightning discharges. In order to attenuate atmospheric interference, directional antennas (when the direction of the desired radio station differs from that of the interference source), as well as special radio receiver circuitry, may be used to alleviate some of the effects of atmospheric attenuation.

As mentioned above, the signal power of a wireless transmission may be attenuated (e.g. reduced) due to distance and atmospheric conditions, which may cause a remote receiver to be unable to receive the radio broadcast. The effect of attenuation of the radio signal in a wireless network link varies depending on the frequency of the radio signal. As the signal attenuates, the throughput of data transfer lowers due to the weaker signal making the transmissions less reliable. Higher frequency radio signals such as those in the 60 GHz band used in the IEEE 802.11 ad standard have the capability of transmitting multi-gigabits per-second due to the high frequency. Atmospheric interference attenuates a signal at a high frequency at a shorter distance than a signal of lower frequency, therefore the high data throughput capability of a high frequency radio signal comes at the cost of the wireless network link having a shorter effective distance. Radio signals for wireless network links using the IEEE 802.11 ac standard, however, use the 5 GHz frequency band. Radio signals using the IEEE 802.11 ac standard can transmit data at a rate of hundreds of megabits per-second, much slower than the multi-gigabits per second capability of the IEEE 802.11 lad standard. Due to the lower frequency of the IEEE 802.11ac in the 5 GHz band, the radio signal can travel a longer distance than the higher frequency IEEE 802.1 lad radio signals. The lower signal frequency of the IEEE 802.11ac radio signals are more reliable at longer distances at the cost of slower data throughput on the wireless network link.

Using a single radio limits the reliability of the network link based on how the frequency attenuation of the radio signal is affected by the weather. This disclosure proposes utilizing multiple wireless network link radios that transmit data using different frequencies to increase the reliability of the wireless networking link.

In one example, a wireless network link may be established between two points a distance apart that is short enough so that high frequency radio signals have a better reliability and throughput than lower frequency radio signal. As used herein, a "short" distance refers to distances where higher frequency (e.g., 60 GHz) radio signals are more efficient and reliable than lower frequency (e.g., 5 GHz) radio signals. Also, a "long" distance refers to the opposite condition where lower frequency radio signals are more reliable and efficient than higher frequency signals. See FIG. 3 to the left of line 340 would be considered a short distance and to the right of line 340 would be considered a long distance. An "active/backup" algorithm is used, in this example, to establish a high data throughput connection over the high frequency radio signal as the primary active wireless network link. The active/backup algorithm may cause a wireless networking device to configure its multiple radios in an active/backup configuration. In the event that the high frequency radio signal becomes unable to transmit data or the data loss over the high frequency radio link lowers the effective throughput below the speed of the lower frequency radio data throughput capability, the active radio may be changed. The high frequency radio connection may be set to "backup" and the low frequency radio may be set to "active" to create the above mentioned active/backup configuration. Techniques of this disclosure may use multiple wireless radios to allow data to flow between the network links when one radio is unavailable or has a reduced data throughput rate.

In another example, a wireless network link may be established between two wireless link devices that are a long distance apart. One or more high frequency radios may have a reduced throughput due to distance and atmospheric conditions, and one or more low frequency radios may have normal or reduced throughput also due to the distance and atmospheric conditions. An "load balancing" algorithm may be utilized to assess the rate of data incoming from the wired network data stream intended to be routed across the wireless link combined with an assessment of the congestion level and throughput of all wireless network links. The algorithm may dynamically assign the data stream to be routed to the wireless network link that has the least amount of congestion and highest data throughput. The algorithm may constantly evaluate the wireless link congestion and available throughput to utilize the wireless link with the highest throughput to transmit the data stream over the wireless network link.

In another example of the use of the "load balancing" algorithm, the rate of data coming through the wired network link may exceed a single wireless radio's data transmission throughput capacity. The load balancing algorithm may choose to split the data stream from the wired network into multiple parts and use each wireless network link to transmit a portion of the data stream in parallel. This method may allow for higher overall data throughput by combining the capacity of multiple wireless network links to increase data transmission throughput.

In another example of the use of the "load balancing" algorithm, multiple data streams from the wired network may be received by the wireless network link device. Some of the streams may desire a higher "Quality of Service" (QoS) and thus these high QoS streams may be transmitted over the best available wireless network link. In this example, the load balancing algorithm may direct all but the highest QoS data streams to a wireless network link with a lower throughput. The higher throughput wireless network link may be reserved for the higher QoS data streams.

Having an understanding of the above overview, this disclosure will now explain a non-limiting but detailed example implementation. This example implementation is explained with reference to the figures and includes: a functional block diagram representing an example of two wireless link devices utilizing two wireless network communication radios to bridge communication between two network sub-nets (FIG. 1A); a functional block diagram representing an example of two wireless link devices utilizing two wireless network communication radios to provide an active link and a backup link to bridge communication between two network sub-nets (FIG. 1B); a functional block diagram representing an example of two wireless link devices utilizing two wireless network communication radios utilizing the backup link to bridge communication between two network sub-nets (FIG. 1C); a functional block diagram representing an example of two wireless link devices utilizing two wireless network communication radios to provide load balanced network paths to bridge communication between two network sub-nets (FIG. 1D); a functional block diagram representing an example the detailed internals of two wireless network link devices (FIG. 2); an example plot showing the throughput of wireless networking signals as the distance between the transmitter and receiver is changed (FIG. 3); an example process illustrating a method of providing a robust wireless network link by re-transmitting data after a failed transmission (FIG. 4); an example computing device with a hardware processor and accessible machine-readable instructions that might be used to compile and execute the algorithm that provides a robust wireless network link by re-transmitting data after a failed transmission (FIG. 5); an example process illustrating a method of providing a robust wireless network link by detecting when a link is suspended to change the network data routing algorithm (FIG. 6); an example computing device with a hardware processor and accessible machine-readable instructions that might be used to compile and execute the algorithm that provides a robust wireless network link by detecting when a link is suspended to change the network data routing algorithm (FIG. 7); an example process illustrating a method of changing the network data routing algorithm to obtain high throughput when a wireless networking signal is attenuated due to distance and atmospheric conditions (FIG. 8); an example computing device with a hardware processor and accessible machine-readable instructions that might be used to compile and execute the algorithm that provides a method of changing the network data routing algorithm to obtain high throughput when a wireless networking signal is attenuated due to distance and atmospheric conditions (FIG. 9); a computer network infrastructure that may be used to implement all or part of the disclosed wireless network link aggregation techniques, according to one or more disclosed implementations (FIG. 10); and a computer processing device that may be used to implement the functions, modules, processing platforms, execution platforms, communication devices, and other methods and processes of this disclosure.

Examples in this section describe computing modules, transceivers, wireless radios, and other components that may be described as components in equipment utilized as part of a data communication network. The descriptions are not intended to limit the implementation of any hardware devices to a specific hardware platform. Any of the examples may have implementations on general purpose computing platforms, computing platforms designed for a specific purpose, or any hybrid combination of general purpose- and custom-built computing platforms.

Referring now to FIG. 1A, an example diagram of a network 100A illustrates the incorporation of devices such as wireless network link points 115 & 120 as one example of a wireless link between two local area networks. The physical connection 140 between wireless network link point 115 and a device 110 connected to a local area network illustrates an example of one side of a wireless link that connects two subnets of a local area network. A similar configuration where physical connection 145 between wireless network link point 120 and a device 125 connected to a local area network illustrates the other side of a wireless link that connects two subnets of a local area network. In this example, devices 110 and 125 may be any device utilized to connect local area network subnets together to form a network. These devices are typically bridges, routers, hubs, or switches but the example is not intended to limit the type of device or the connection method used to connect a wireless link device to a local area network.

In the example of FIG. 1A, wireless link points 115 and 120 illustrate two sides of a wireless communication link across an air gap 105 of any distance. Wireless link 130 may be formed utilizing a protocol such as IEEE 802.11ad to form a bi-directional communication link between wireless link points 115 and 120. Similarly, wireless link 135 may be formed utilizing a different protocol such as IEEE 802.11 ac to form an additional bi-directional communication link between wireless link points 115 and 120. For the purposes of this example, wireless link points 115 and 120 are illustrated as implementing two bi-directional links utilizing different protocols but this is not intended to limit the number of wireless links a device may use to implement the methods in this disclosure. The protocols utilized to form wireless links 130 and 135 between wireless link points 115 and 120 are illustrated as different wireless protocols for this example without intending to limit the implementation to utilizing different protocols. A real world implementation may utilize multiple wireless link of any wireless protocol. The standard protocols IEEE 802.11ac and IEEE 802.1 lad are also utilized for purposes of illustration in this example but are not intended to limit the implementation of the techniques in this disclosure to utilizing those protocols.

Figure 1B:
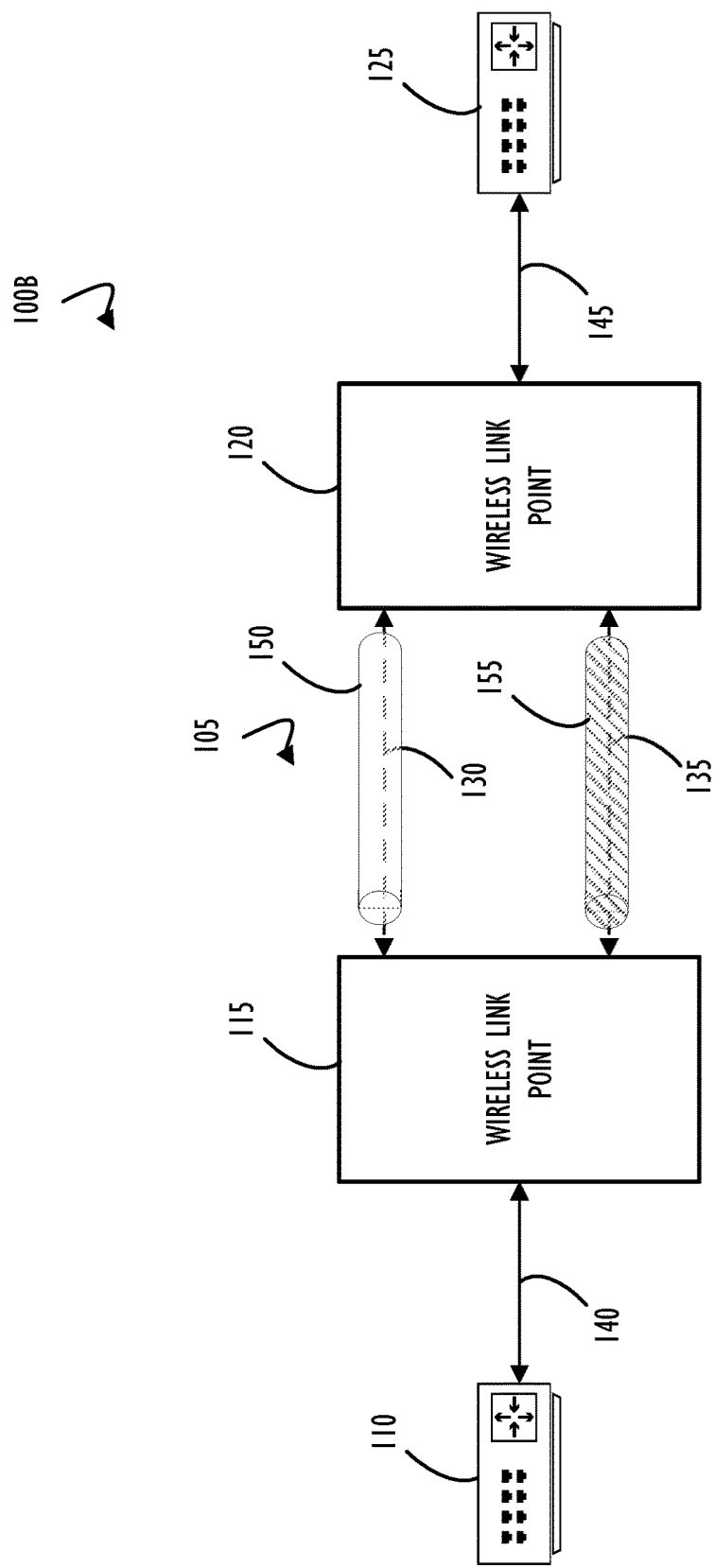
FIG. 1B is a functional block diagram representing an example of two wireless link devices utilizing two wireless network communication radios to provide an active link and a backup link to bridge communication between two network sub-nets, according to one or more disclosed implementations.

Referring now to FIG. 1B, an example block diagram of a network 100B illustrates wireless link points 115 & 120 providing wireless network links 130 & 135 over a short distance 105 to illustrate an active/backup algorithm that may be utilizing multiple wireless network links. In this example, high frequency wireless network link 130 is utilized as the active high data throughput network path 150. Lower frequency wireless network link 135 is inactive and utilized as a backup network data path available should the active high throughput network path 150 should become unavailable.

Figure 1C:
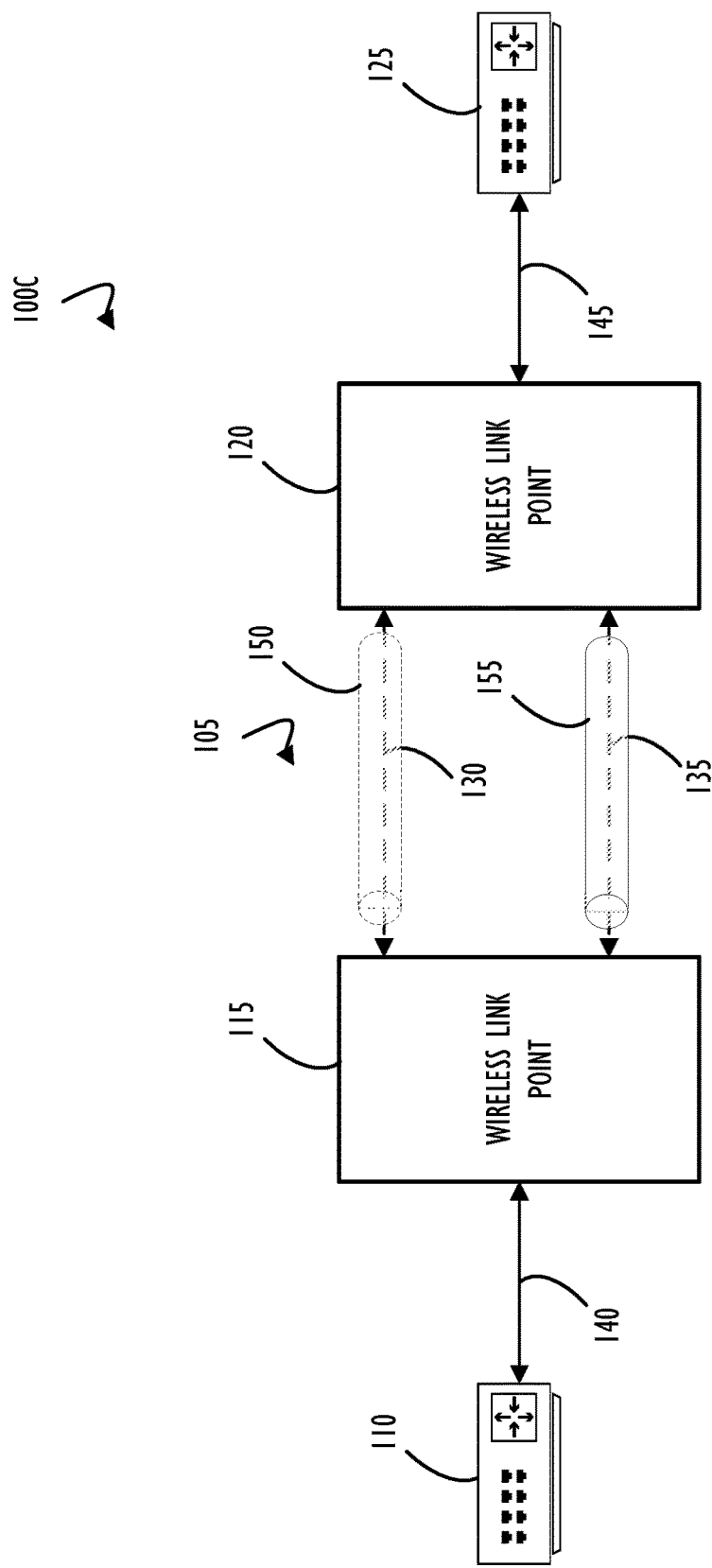
FIG. 1C is a functional block diagram representing an example of two wireless link devices utilizing two wireless network communication radios utilizing the backup link to bridge communication between two network sub-nets, according to one or more disclosed implementations.

Referring now to FIG. 1C, an example block diagram of a network 100C illustrates wireless link points 115 & 120 providing wireless network links 130 & 135 over a short distance 105 to illustrate an active/backup algorithm that may be utilizing multiple wireless network links. This example diagram illustrates the lower throughput network data path 155 as the active network data path where it was previously illustrated as the idle backup network data path in FIG. 1B. Lower throughput network data path 155 utilizes lower frequency wireless network link 135 to transmit data over short distance 105. High throughput network data path 150 is unavailable when high frequency wireless network link 130 becomes unavailable.

Figure 1D:
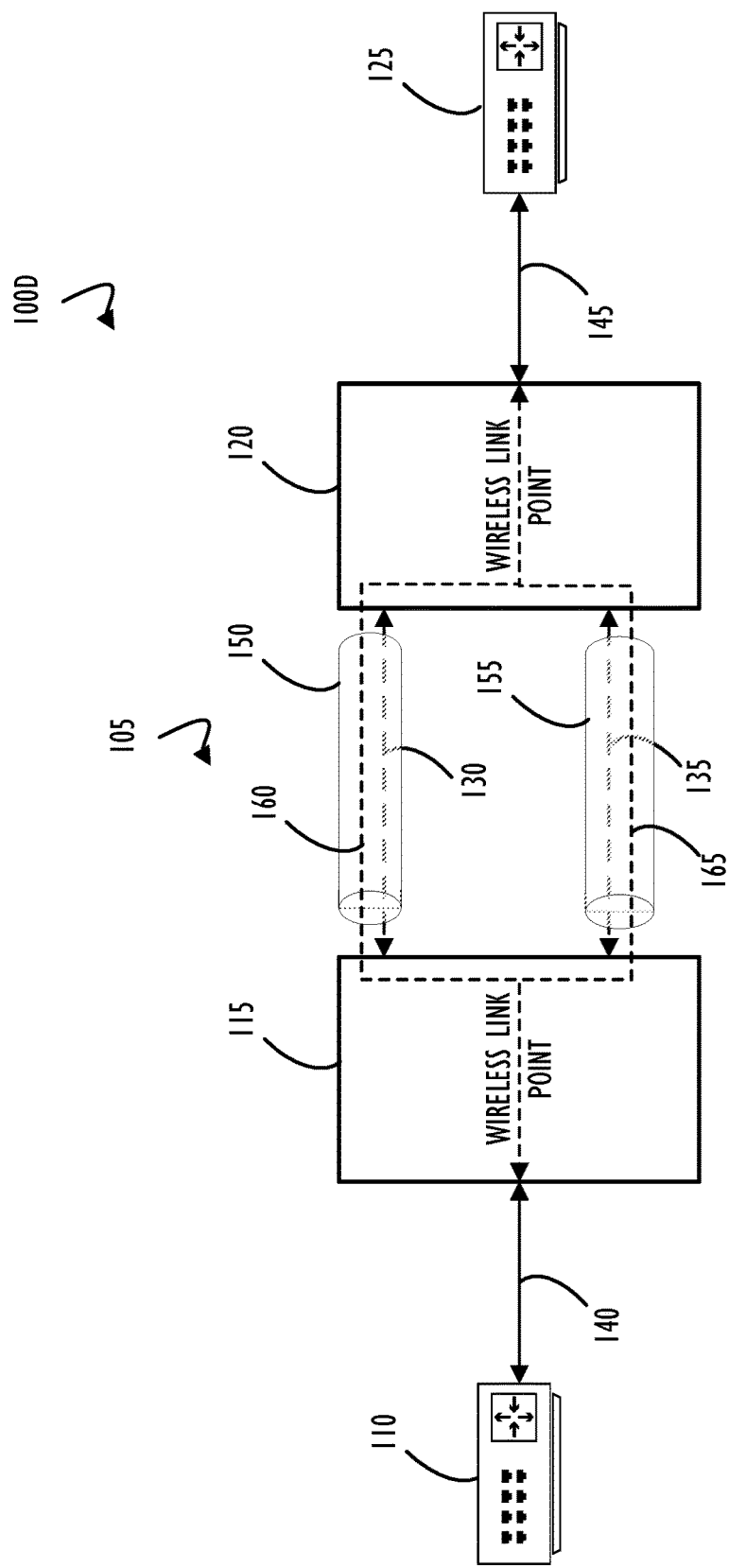
FIG. 1D is a functional block diagram representing an example of two wireless link devices utilizing two wireless network communication radios to provide load balanced network paths to bridge communication between two network sub-nets, according to one or more disclosed implementations.

Referring now to FIG. 1D, an example block diagram of a network 100D illustrates wireless link points 115 & 120 providing wireless network links 130 & 135 over a long distance 105 to illustrate a load balancing algorithm that may be utilizing multiple wireless network links. In this example, high frequency wireless network link 130 provides less data throughput capability when the distance and atmospheric conditions in the gap 105 between the wireless link points 115 & 120 is sufficient to attenuate the high frequency signal. Network data path 150 may have reduced data throughput as a result of the attenuation of the high frequency signal used in wireless network link 130. Network data path 155 utilizing lower frequency wireless network link 135 has a normal data throughput due to the lower frequency radio signal not being subject to attenuation in the same manner as the higher frequency radio signal utilized by wireless network link 130. In this example, network data stream 160 may be assigned to use the network data path 150 to transfer data between sub-nets 110 & 125. Network data stream 165 may be transferring data in parallel with network data stream 160 but may be assigned to use network data path 155 to transfer data between sub-nets 110 & 125.

Figure 2:
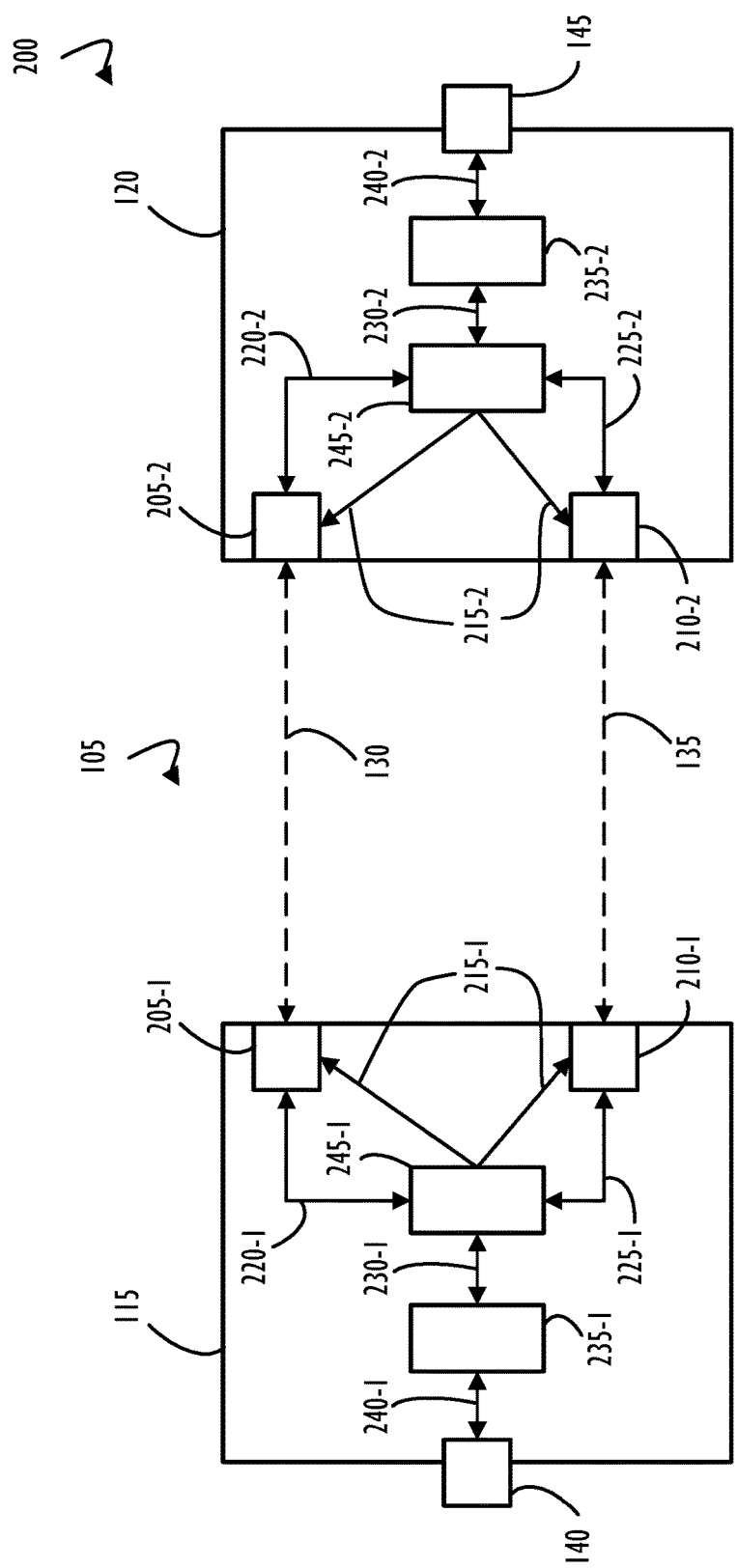
FIG. 2 is a functional block diagram representing an example of detailed internals of two wireless network link devices, according to one or more disclosed implementations.

Referring now to FIG. 2, an example block diagram 200 illustrates a detailed view of the wireless link points 115 and 120 creating wireless links 130 and 135 over air gap 105. The wireless links, in this example, may be utilized to connect two subnets of a local area network over physical links 140 and 145. For purposes of this example, the diagram illustrates two wireless link devices as having identical internal components and physical connections but this is not intended to limit the implementation of a wireless link to two identical devices. Each device may function alternately as transmitter or receiver of data as data flows through the local area network connected to each device. It should be understood that both wireless link devices typically function both as a transmitter and receiver in relation to the direction of data flow across the wireless links.

Still referring to FIG. 2, the physical connections 140 and 145 to each subnet of a local area network may have a physical connection 240 (as illustrated by 240-1 and 240-2 respectively) to a transceiver module 235 (as illustrated by 235-1 and 235-2 respectively) that may send and receive data between the local area network and the wireless link points 115 and 120. The wireless link device may interface with transceiver module 235 with a physical connection 230 (as illustrated by 230-1 and 230-2 respectively) between the transceiver module 235 and computing module 245 (as illustrated by 245-1 and 245-2 respectively).

Computing module 245 may additionally interface with wireless radio 205 (as illustrated by 205-1 and 205-2 respectively) via physical connection 220 (as illustrated by 220-1 and 220-2 respectively) for data transmission and reception over wireless link 130. Computing module 245 may also interface with wireless radio 210 (as illustrated by 210-1 and 210-2 respectively) via physical connection 225 (as illustrated by 225-1 and 225-2 respectively) for data transmission and reception over wireless link 135. Computing module 245 may implement an additional interface with wireless radios 205 and 210 for purposes of monitoring the status of the radios over physical connection 215.

Computing module 245, when operating on the transmitting side of any wireless link, may implement a plurality of algorithms that determine which wireless link will be used to transmit data to the remote wireless link device.

In one example, data from the local area network subnet 140 may be received by wireless link point 115 for transmission to wireless link device 120. Data from local area subnet 140, in this example, is received by transceiver 235-1 over physical connection 240-1. Transceiver 235-1 may then send the received data to compute module 245-1 over physical connection 230-1. Computing module 245-1 may then process the data utilizing a plurality of algorithms to choose the path best suited for transmitting the data to the remote wireless link device 120.

In this example, computing module 245-1 may utilize the ability to monitor the status of connected wireless radios over physical link 215-1 to choose the radio with the lowest level of congestion and proper relative received signal strength indication (RSSI). Congestion levels may be determined using a number of different techniques (either alone or in combination with each other). RSSI represents an indication of the power level being received by the receive radio after the antenna and possible cable loss. The higher the RSSI the stronger the signal. Some of the techniques for determining congestion level may include physical rate monitoring, channel utilization, pending packet numbers that are buffered for transmission, etc. Congestion levels may be monitored at the network level as a whole or for individual components of network communication devices. For example, if a wireless access point has multiple radios or a single radio supports multiple channels, congestion may happen at any of these individual levels (channel, radio, network, etc.). Accordingly, in some implementations of this disclosure, if radio 205-1 is the lessor congested, data transmission would route to radio 205-1 over physical link 220-1. The transmission to the remote wireless link device may then be performed when radio 205-1 transmits data to radio 205-2 over wireless link 130. The data received by radio 205-2 may then be sent to compute module 245-2 over physical connection 220-2. Compute module 245-2 may then route the received data to local area network transceiver 235-2 over physical connection 230-2. Network transceiver 235-2 may then transmit the received data to local area network subnet 145 over physical connection 240-2.

Figure 3:
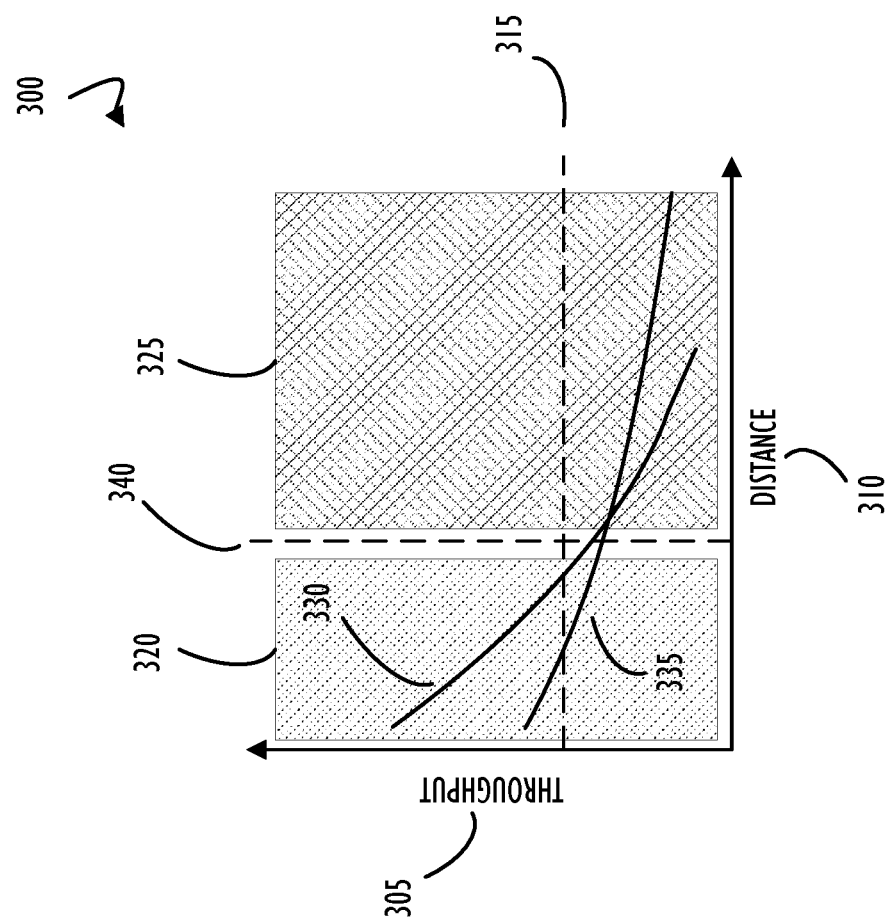
FIG. 3 is a is an example plot showing throughput of wireless networking signals as the distance between the transmitter and receiver is changed, according to one or more disclosed implementations.

Referring now to FIG. 3, an example plot 300 is used to illustrate at least one effect of attenuation on throughput for a high frequency radio signal 330 and a lower frequency radio signal 335. The scale of the elements in the plot 300 are not intended to be scientifically precise but are illustrative for the purposes of this example. The X-axis of the plot 310 shows relative distance measurements between transmit (TX) and receive (RX) wireless radios. The Y-axis of the plot 305 shows the relative data throughput capability of a radio signal. Horizontal dashed line 315 illustrates the throughput capability of a wired ethernet link where the distance is assumed to have a negligible effect on signal attenuation between wired transmit and receive devices for purposes of this example. It should be understood that signal attenuation still occurs with signals that are wired but that the causes of signal attenuation are different than the causes of signal attenuation with radio (wireless) signals.

The plotted attenuation of the high frequency radio signal 330 demonstrates a very high throughput at short distances. As the distance increases between the TX and RX radios, the plot demonstrates that the data throughput decreases somewhat quickly due to signal attenuation. The plotted attenuation of the lower frequency radio signal 335 demonstrates that the data throughput is relatively lower at short distance than the high frequency radio signal due to the difference in elements of data that can be transmitted per second when utilizing a low frequency radio signal. The data throughput of the lower frequency radio signal 335, in contrast to the higher frequency radio signal 330, has less of a data throughput loss as the distance between the TX and RX radios increases due to less attenuation of the signal. That is, the graph illustrates line of different slope. The lower frequency radio signal 335 eventually crosses the higher frequency radio signal 330 plot demonstrating that the lower frequency radio signal 335 can maintain a higher throughput than the high frequency radio signal 330 after some distance (which may not be a constant distance due to atmospheric interference that does not remain constant). Distance represents only one parameter that may affect communication between two radios communicating at a particular frequency. Other factors include atmospheric conditions and possibly other forms of interference that are transitory in nature. Accordingly, the techniques of this disclosure are not limited to be implemented based on changes in distance. Rather, they may be implemented based on monitoring connectivity and successful throughput of different available communication techniques. In one specific example, if there is a large packet loss for one radio that may be an indication of a communication problem that may cause the load balancing or active/backup techniques of this disclosure to be invoked (even though distance may not have changed).

Still referring to FIG. 3, the shaded region 320 illustrates the region where implementations in accordance with the techniques of this disclosure may utilize an active/backup algorithm as described in the example of FIG. 1B. In this region, the high frequency radio signal 330 provides the link for high throughput data transfer while the lower frequency radio signal 335 remains idle as a backup path for network data in the event the higher frequency signal 330 is no longer available. The example in FIG. 1C illustrated the network data transfer path when the backup wireless network link assumes the duties of the active wireless network link.

The vertical dashed line 340 illustrates the distance and data throughput threshold that determines when some implementations may cause the wireless radio signals 330 & 335 to be transitioned from using an active/backup algorithm to using a load balancing algorithm. Shaded region 325 illustrates the distance and data throughput threshold where both wireless radio links are utilized to transfer network data between wireless link devices. One example of load balancing is illustrated in FIG. 1D.

Figure 4:
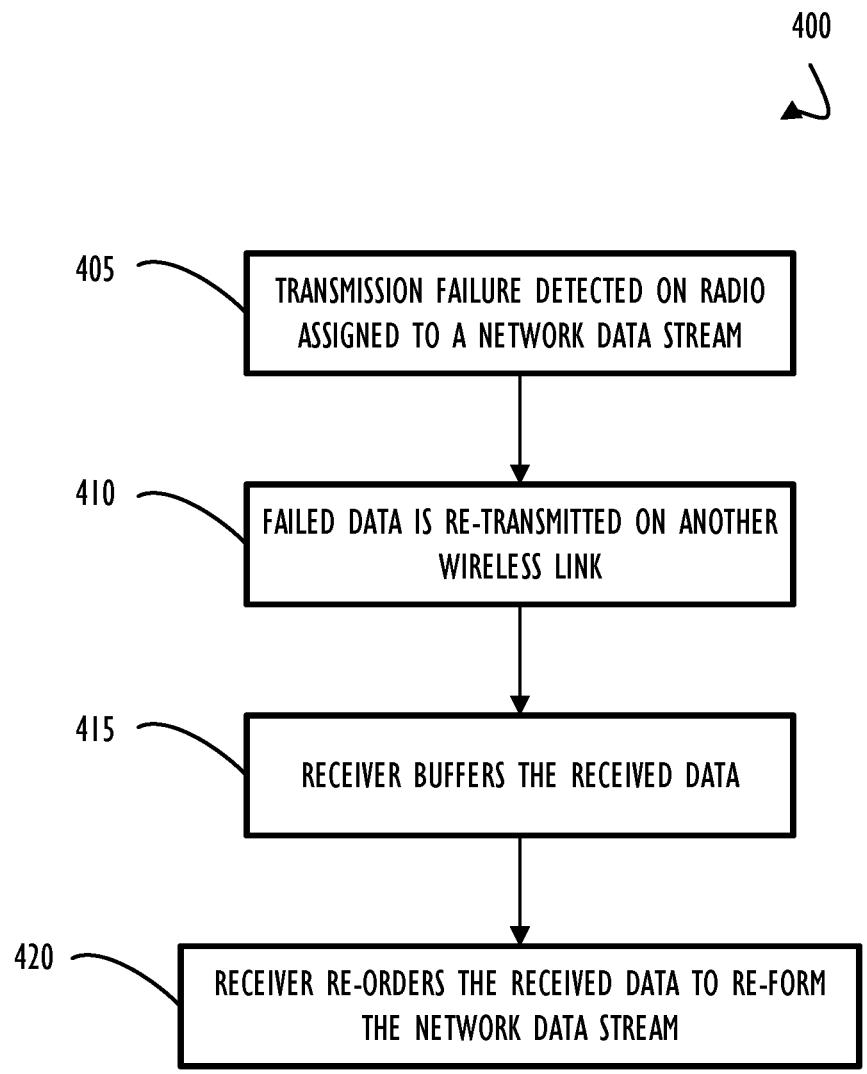
FIG. 4 is an example process illustrating a method of providing a robust wireless network link by re-transmitting data after a failed transmission, according to one or more disclosed implementations.

Referring now to FIG. 4, there is shown a flow diagram 400 depicting one example algorithm that may utilize the techniques in accordance with the examples above to enhance the robustness of a wireless network link. Block 405 describes when a radio transmission failure is detected on that radio, a network device may re-transmit the data that failed to be transmitted because of the failure. Block 410 describes where the data may be re-transmitted on another radio. Continuing to block 415, the receiver of the re-transmitted data will buffer received data. Continuing to block 420, the receiver evaluates the buffered received data and re-orders the data that was received to re-form the network data stream. The receiver may never be aware that there was a transmission failure as the re-transmission and re-ordering may make the network data stream appear to the receiver as if it were never interrupted.

Figure 5:
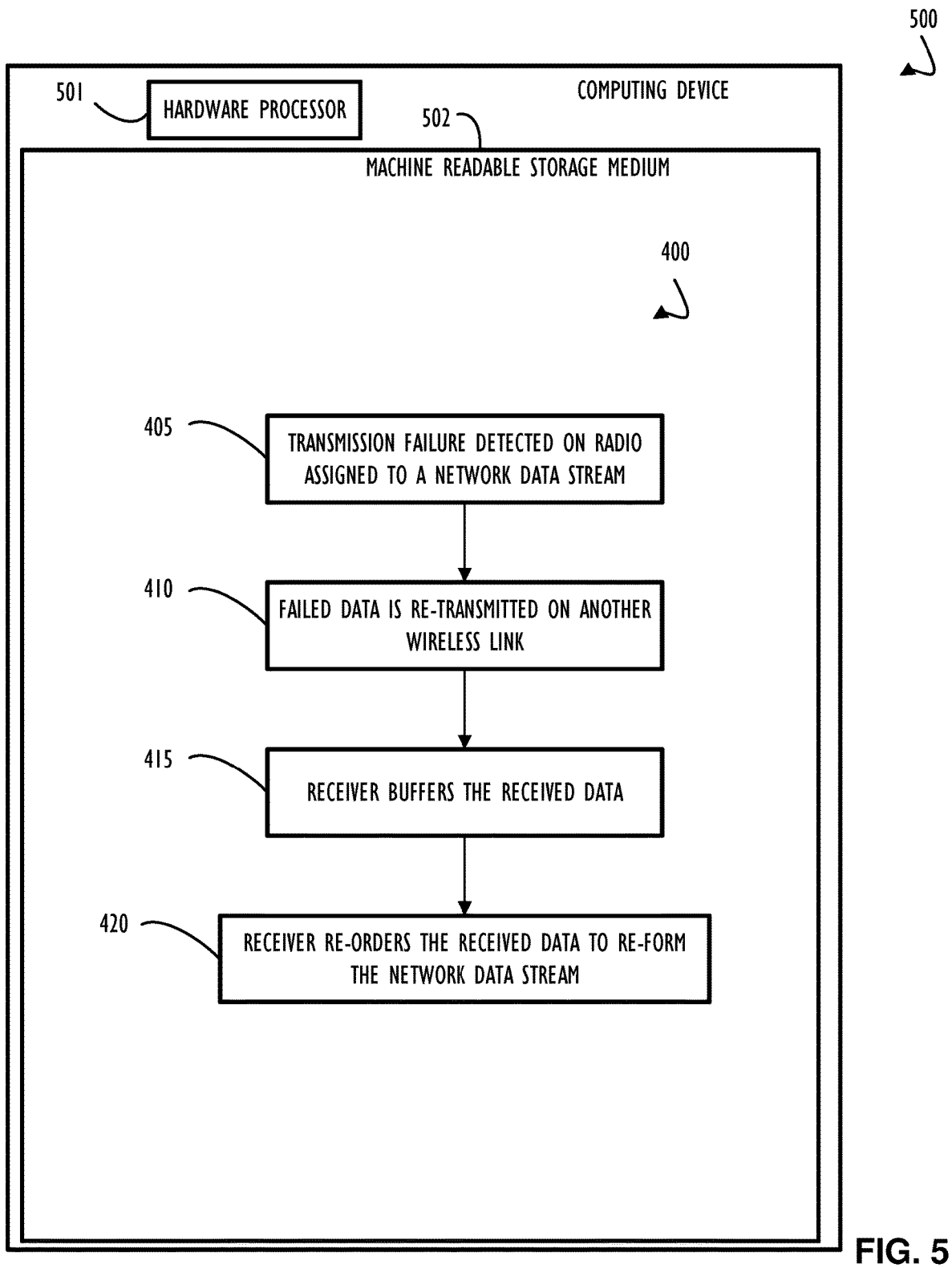
FIG. 5 is an example computing device with a hardware processor and accessible machine-readable instructions that might be used to compile and execute the algorithm that provides a robust wireless network link by re-transmitting data after a failed transmission, according to one or more disclosed implementations.

Referring now to FIG. 5 is an example computing device 500, with a hardware processor 501, and accessible machine-readable instructions stored on a machine-readable medium 502 that may be used to develop and execute the algorithm 400 described in FIG. 4 to enhance robustness of a wireless network link, according to one or more disclosed example implementations. FIG. 5 illustrates computing device 500 configured to perform the flow of method 400 as an example. However, computing device 500 may also be configured to perform the flow of other methods, techniques, functions, or processes described in this disclosure. In this example of FIG. 5, machine-readable storage medium 502 includes instructions to cause hardware processor 501 to perform blocks 405-420 discussed above with reference to FIG. 4.

A machine-readable storage medium, such as 502 of FIG. 5, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 6:
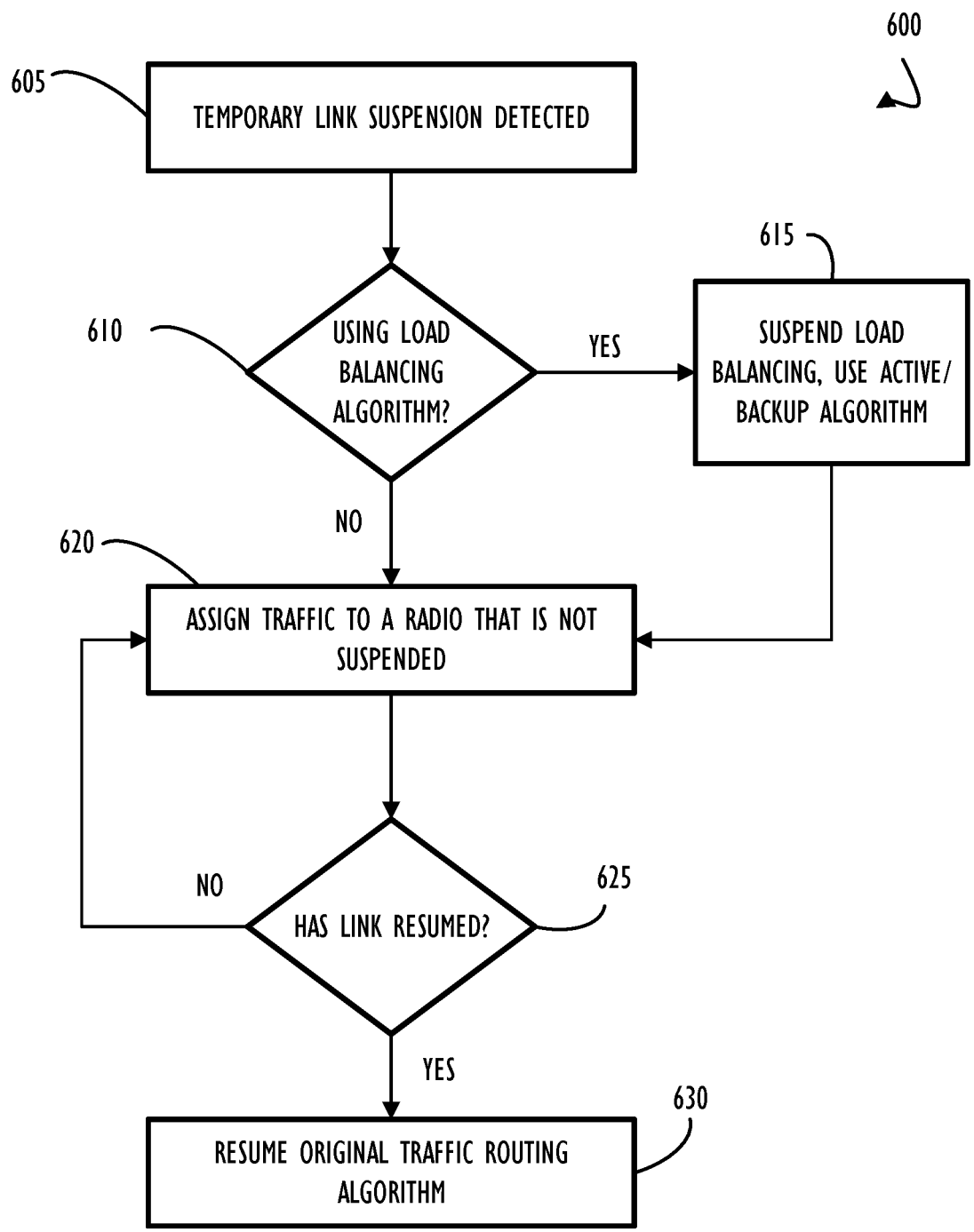
FIG. 6 is an example process illustrating a method of providing a robust wireless network link by detecting when a link is suspended to change the network data muting algorithm, according to one or more disclosed implementations.

Referring now to FIG. 6, there is shown a flow diagram of an example algorithm 600 that may provide a robust link when one wireless network link is suspended. Block 605 detects when a link has been suspended and can no longer transmit data. Continuing to block 610, an evaluation of the current network data routing algorithm is evaluated. If the load balancing algorithm is currently in use, the flow continues to block 615. Block 615 suspends the use of the load balancing algorithm and begins to use the active/backup algorithm to route network data to the active wireless network link. Continuing to block 620, the traffic is assigned to the active wireless network link. Had the load balancing algorithm not been in use, block 610 would have also continued to block 620. Continuing to block 625, the suspended link is monitored to detect when the link is unsuspended. While the link is suspended, block 625 returns to block 620. If the link is unsuspended, block 625 continues to block 630. Block 630 resumes the use of the network traffic routing algorithm that was in use at the time the link was temporarily suspended.

Figure 7:
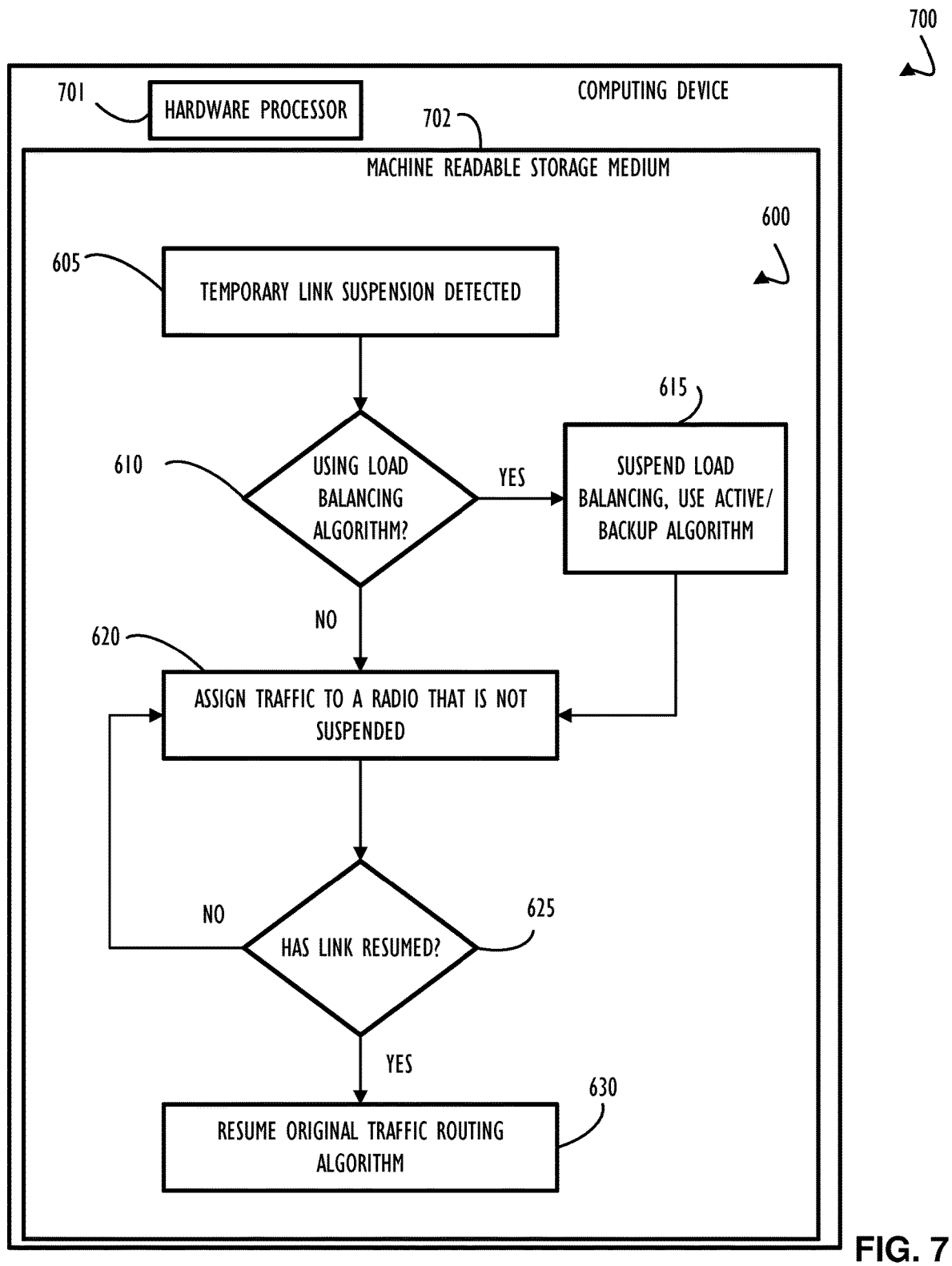
FIG. 7 is an example computing device with a hardware processor and accessible machine-readable instructions that might be used to compile and execute the algorithm that provides a robust wireless network link by detecting when a link is suspended to change the network data routing algorithm, according to one or more disclosed implementations.

Referring now to FIG. 7, shown is an example computing device 700, with a hardware processor 701, and accessible machine-readable instructions stored on a machine-readable medium 702 that may be used to execute the link suspension detection algorithm 600, according to one or more disclosed example implementations. FIG. 7 illustrates computing device 700 configured to perform the flow of method 600 as an example. However, computing device 700 may also be configured to perform the flow of other methods, techniques, functions, or processes described in this disclosure. In this example of FIG. 7, machine-readable storage medium 702 includes instructions to cause hardware processor 701 to perform blocks 605-630 discussed above with reference to FIG. 6.

A machine-readable storage medium, such as 702 of FIG. 7, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 8:
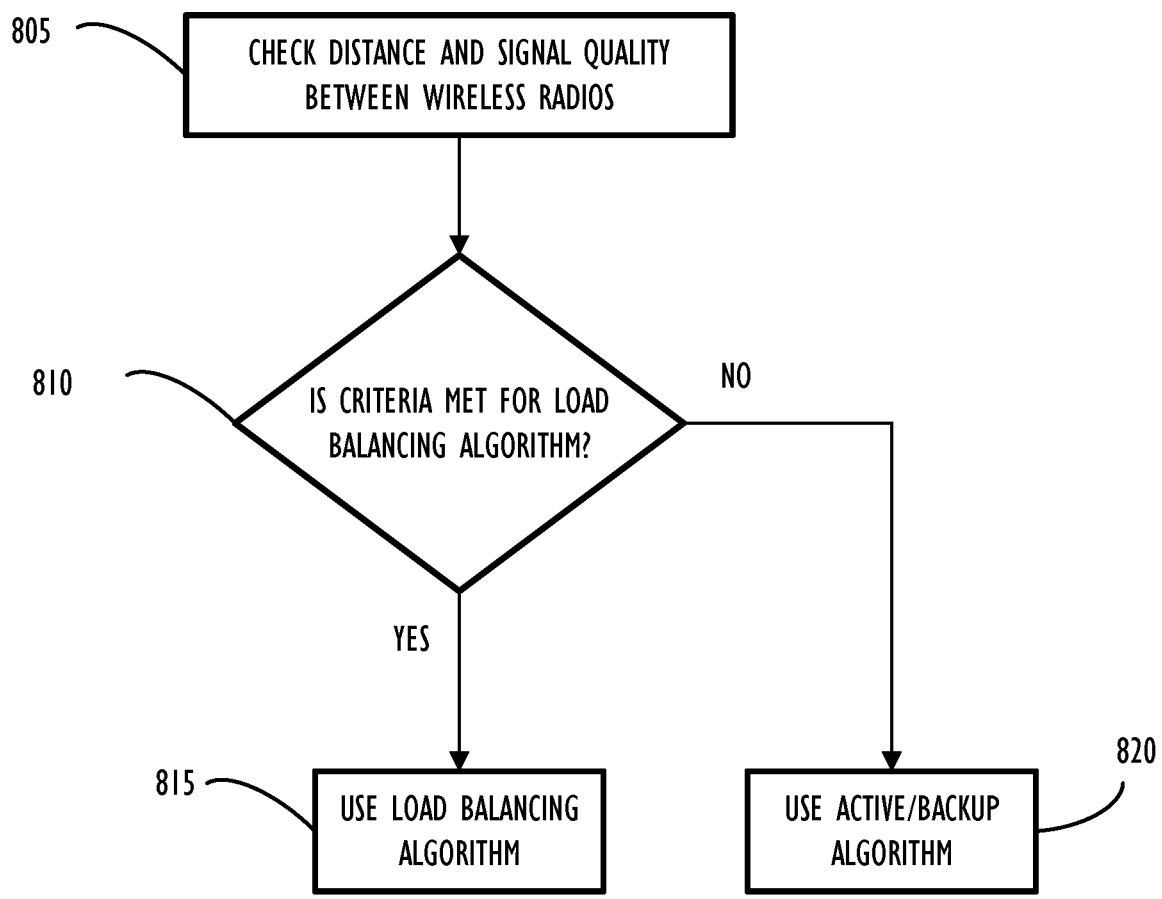
FIG. 8 is an example process illustrating a method of changing the network data routing algorithm to obtain high throughput when a wireless networking signal is attenuated due to distance and atmospheric conditions, according to one or more disclosed implementations.

Referring now to FIG. 8, there is shown a flow diagram 800 depicting one example algorithm that may be used to change the network data routing algorithm to maintain a high data transfer throughput when wireless network link signals encounter reduced throughput due to radio signal attenuation (or some other factor affecting throughput). The criteria for choosing the network data routing algorithm may be in the form of network statistics (e.g., processed packets, bandwidth available, dropped packets, error events, etc.) collected in block 805. Continuing to block 810, the criteria is evaluated to choose the appropriate algorithm. In general, any criteria that determines a more robust communication across all available communication options (e.g., multiple radios) may be acceptable. In this example, if the distance and signal quality do not meet the criteria for using load balancing, flow continues to block 820 and the active/backup algorithm is used. If the distance and signal quality do meet the criteria for using load balancing, the flow continues to block 815 and the load balancing algorithm is used.

Figure 9:
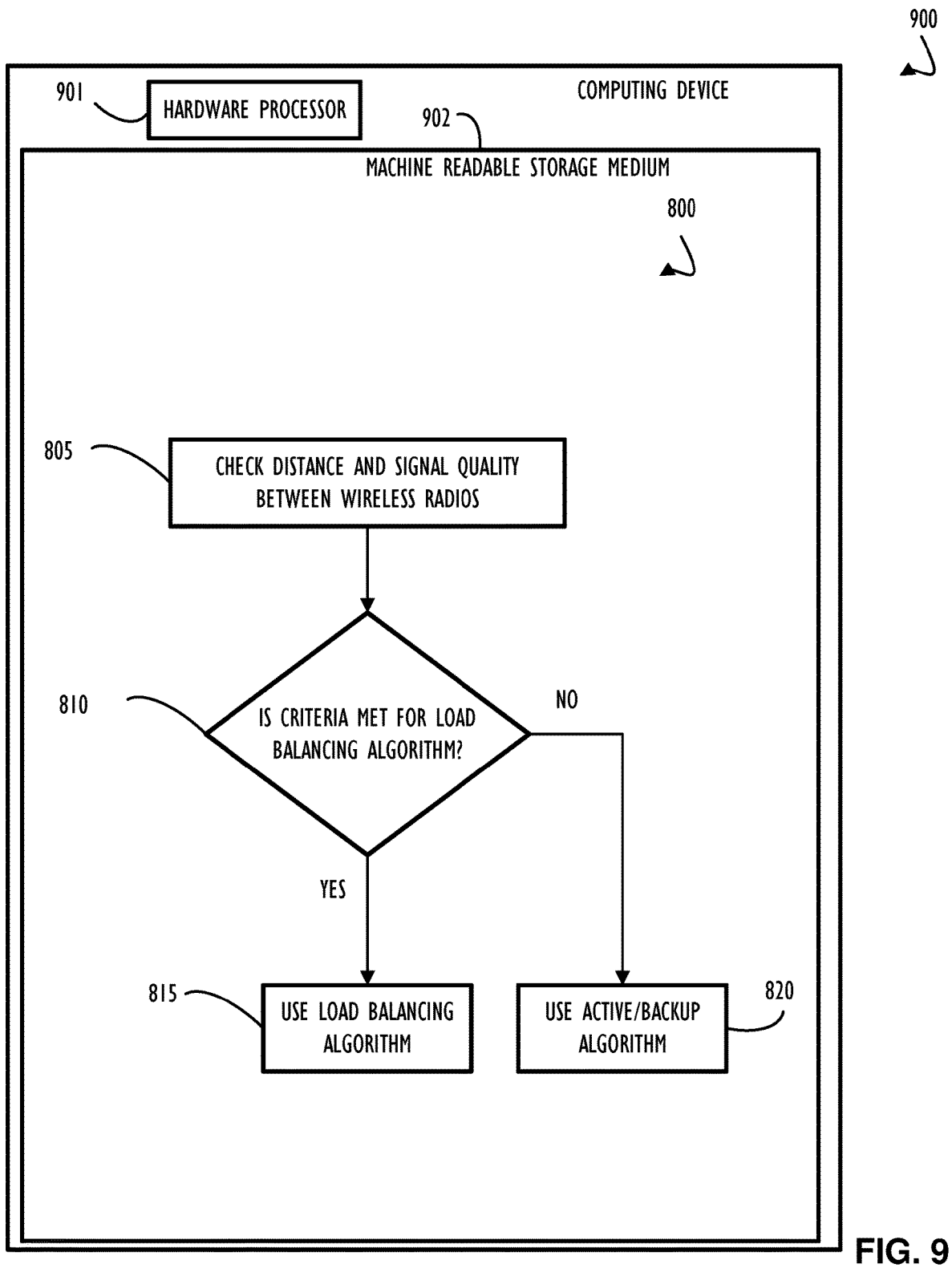
FIG. 9 is an example computing device with a hardware processor and accessible machine-readable instructions that might be used to compile and execute the algorithm that provides a method of changing the network data routing algorithm to obtain high throughput when a wireless networking signal is attenuated due to distance and atmospheric conditions, according to one or more disclosed implementations.

Referring now to FIG. 9, shown is an example computing device 900, with a hardware processor 901, and accessible machine-readable instructions stored on a machine-readable medium 902 that may be used to develop and execute the algorithm to choose the network data routing algorithm, according to one or more disclosed example implementations. FIG. 9 illustrates computing device 900 configured to perform the flow of method 800 as an example. However, computing device 900 may also be configured to perform the flow of other methods, techniques, functions, or processes described in this disclosure. In this example of FIG. 9, machine-readable storage medium 902 includes instructions to cause hardware processor 901 to perform blocks 805-820 discussed above with reference to FIG. 8.

A machine-readable storage medium, such as 902 of FIG. 9, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 10:
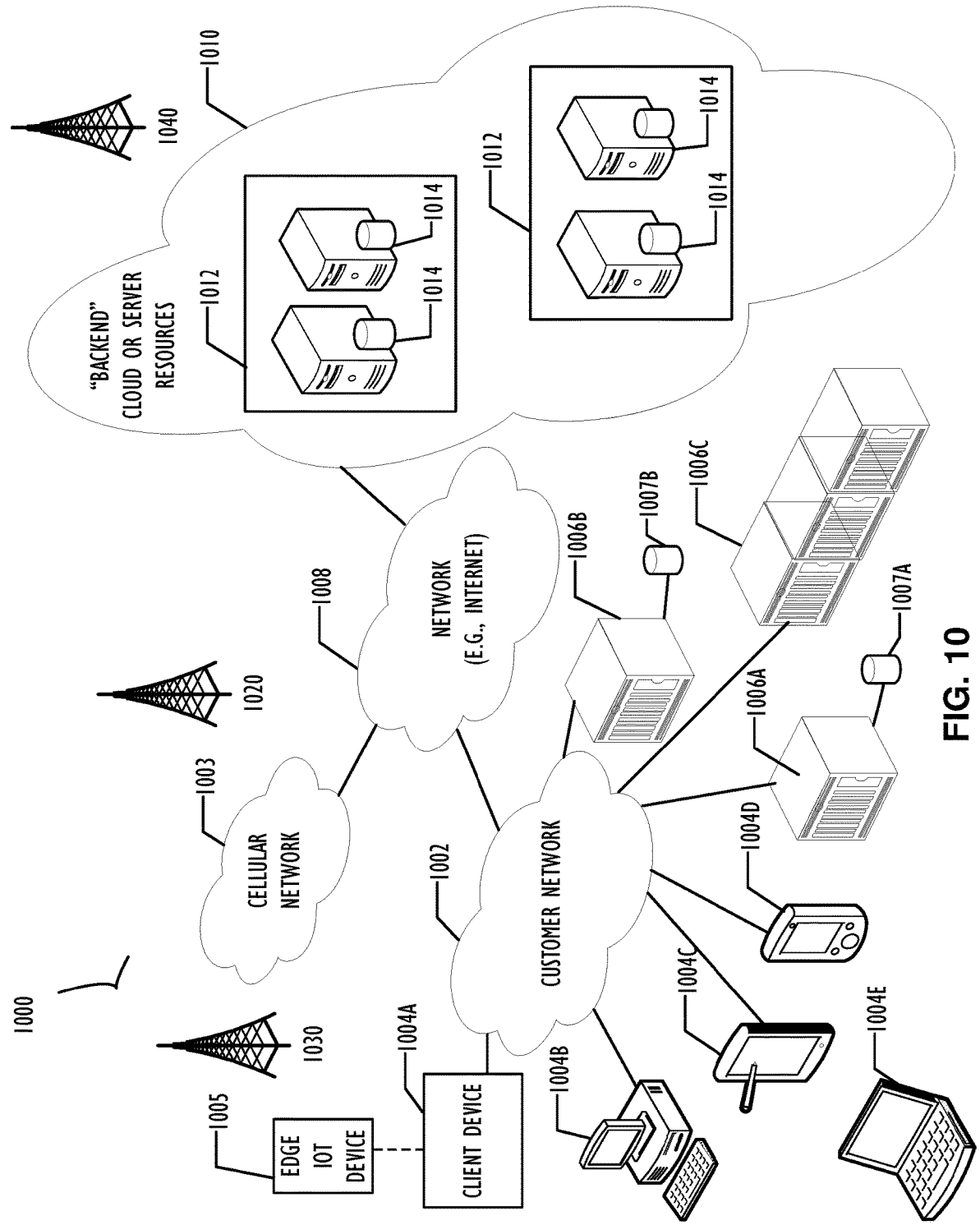
FIG. 10 represents a computer network infrastructure that may be used to implement all or part of the disclosed wireless network link aggregation techniques, according to one or more disclosed implementations.

FIG. 10 represents a computer network infrastructure that may be used to implement all or part of the disclosed link aggregation techniques, according to one or more disclosed implementations. Network infrastructure 1000 includes a set of networks where examples of the present disclosure may operate. Network infrastructure 1000 comprises a customer network 1002, network 1008, cellular network 1003, and a cloud service provider network 1010. In one example, the customer network 1002 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi networks, or Bluetooth®). In another example, customer network 1002 represents an enterprise network that could include or be communicatively coupled to one or more local area networks (LANs), virtual networks, data centers and/or other remote networks (e.g., 1008, 1010). In the context of the present disclosure, customer network 1002 may include multiple devices configured with the disclosed improved throughput and communication reliability techniques such as those described above.

As shown in FIG. 10, customer network 1002 may be connected to one or more client devices 1004A-E and allow the client devices 1004A-E to communicate with each other and/or with cloud service provider network 1010, via network 1008 (e.g., Internet). Client devices 1004A-E may be computing systems such as desktop computer 1004B, tablet computer 1004C, mobile phone 1004D, laptop computer (shown as wireless) 1004E, and/or other types of computing systems generically shown as client device 1004A.

Network infrastructure 1000 may also include other types of devices generally referred to as Internet of Things (IoT) (e.g., edge IOT device 1005) that may be configured to send and receive information via a network to access cloud computing services or interact with a remote web browser application (e.g., to receive configuration information).

FIG. 10 also illustrates that customer network 1002 includes local compute resources 1006A-C that may include a server, access point, router, or other device configured to provide for local computational resources and/or facilitate communication amongst networks and devices. For example, local compute resources 1006A-C may be one or more physical local hardware devices, such as different configurations of storage nodes outlined above. Local compute resources 1006A-C may also facilitate communication between other external applications, data sources (e.g., 1007A and 1007B), and services, and customer network 1002. Local compute resource 1006C illustrates a possible processing system cluster with three nodes. Of course, any number of nodes is possible, but three are shown in this example for illustrative purposes.

Network infrastructure 1000 also includes cellular network 1003 for use with mobile communication devices. Mobile cellular networks support mobile phones and many other types of mobile devices such as laptops etc. Mobile devices in network infrastructure 1000 are illustrated as mobile phone 1004D, laptop computer 1004E, and tablet computer 1004C. A mobile device such as mobile phone 1004D may interact with one or more mobile provider networks as the mobile device moves, typically interacting with a plurality of mobile network towers 1020, 1030, and 1040 for connecting to the cellular network 1003. In the context of the link aggregation and wireless network radio signal quality monitoring, user alerts as to initiating of load balancing actions may be configured to provide an end-user notification. In some implementations, this notification may be provided through network infrastructure 1000 directly to a system administrators cellular phone.

Although referred to as a cellular network in FIG. 10, a mobile device may interact with towers of more than one provider network, as well as with multiple non-cellular devices such as wireless access points and routers (e.g., local compute resources 1006A-C). In addition, the mobile devices may interact with other mobile devices or with non-mobile devices such as desktop computer 1004B and various types of client device 1004A for desired services. Although not specifically illustrated in FIG. 10, customer network 1002 may also include a dedicated network device (e.g., gateway or router) or a combination of network devices (not shown) that implement a customer firewall or intrusion protection system. These types of devices may be configured to provide an administrative interface to wireless link devices described in this disclosure.

FIG. 10 illustrates that customer network 1002 is coupled to a network 1008. Network 1008 may include one or more computing networks available today, such as other LANs, wide area networks (WAN), the Internet, and/or other remote networks, in order to transfer data between client devices 1004A-D and cloud service provider network 1010. Each of the computing networks within network 1008 may contain wired and/or wireless programmable devices that operate in the electrical and/or optical domain.

In FIG. 10, cloud service provider network 1010 is illustrated as a remote network (e.g., a cloud network) that is able to communicate with client devices 1004A-E via customer network 1002 and network 1008. The cloud service provider network 1010 acts as a platform that provides additional computing resources to the client devices 1004A-E and/or customer network 1002. In one example, cloud service provider network 1010 includes one or more data centers 1012 with one or more server instances 1014.

Figure 11:
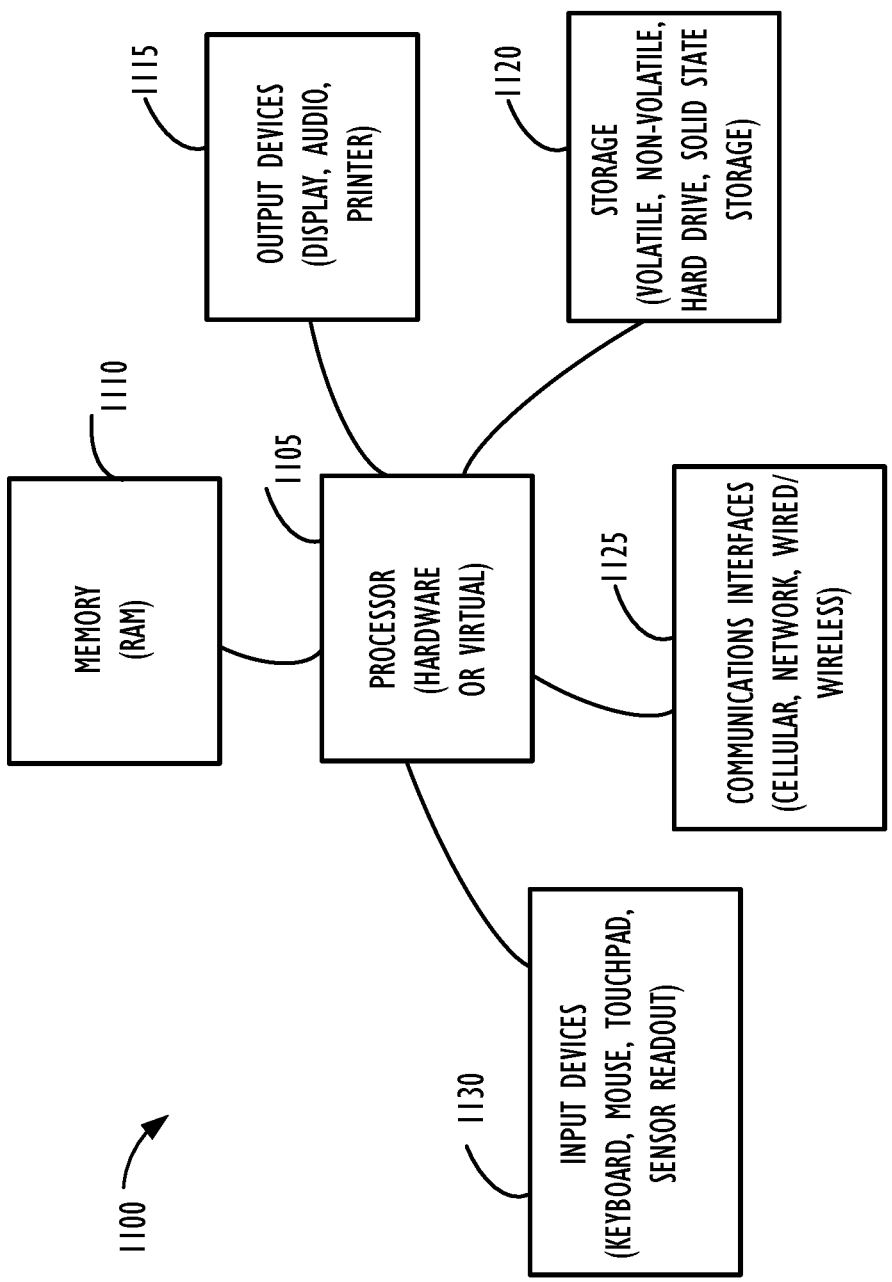
FIG. 11 illustrates a computer processing device that may be used to implement the functions, modules, processing platforms, execution platforms, communication devices, and other methods and processes of this disclosure.

FIG. 11 illustrates a computer processing device 1100 that may be used to implement the functions, modules, processing platforms, execution platforms, communication devices, and other methods and processes of this disclosure. For example, computing device 1100 illustrated in FIG. 11 could represent a client device or a physical server device and include either hardware or virtual processor(s) depending on the level of abstraction of the computing device. In some instances (without abstraction), computing device 1100 and its elements, as shown in FIG. 11, each relate to physical hardware. Alternatively, in some instances one, more, or all of the elements could be implemented using emulators or virtual machines as levels of abstraction. In any case, no matter how many levels of abstraction away from the physical hardware, computing device 1100 at its lowest level may be implemented on physical hardware.

As also shown in FIG. 11, computing device 1100 may include one or more input devices 1130, such as a keyboard, mouse, touchpad, or sensor readout (e.g., biometric scanner) and one or more output devices 1115, such as displays, speakers for audio, or printers. Some devices may be configured as input/output devices also (e.g., a network interface or touchscreen display).

Computing device 1100 may also include communications interfaces 1125, such as a network communication unit that could include a wired communication component and/or a wireless communications component, which may be communicatively coupled to processor 1105. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 11, computing device 1100 includes a processing element such as processor 1105 that contains one or more hardware processors, where each hardware processor may have a single or multiple processor cores. In one example, the processor 1105 may include at least one shared cache that stores data (e.g., computing instructions) that are utilized by one or more other components of processor 1105. For example, the shared cache may be a locally cached data stored in a memory for faster access by components of the processing elements that make up processor 1105. In one or more examples, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 11, the processing elements that make up processor 1105 may also include one or more of other types of hardware processing components, such as graphics processing units (GPU), application specific integrated circuits (ASICs), field-programmable gate arrays (FPGAs), and/or digital signal processors (DSPs).

FIG. 11 illustrates that memory 1110 may be operatively and communicatively coupled to processor 1105. Memory 1110 may be a non-transitory medium configured to store various types of data. For example, memory 1110 may include one or more storage devices 1120 that comprise a non-volatile storage device and/or volatile memory. Volatile memory, such as random-access memory (RAM), can be any suitable non-permanent storage device. The non-volatile storage devices 1120 can include one or more disk drives, optical drives, solid-state drives (SSDs), tap drives, flash memory, read-only memory (ROM), and/or any other type of memory designed to maintain data for a duration of time after a power loss or shut down operation. In certain instances, the non-volatile storage devices 1120 may be used to store overflow data if allocated RAM is not large enough to hold all working data. The non-volatile storage devices 1120 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1105. In one example, the compiling process of the software program may transform program code written in a programming language to another computer language such that the processor 1105 is able to execute the programming code. For example, the compiling process of the software program may generate an executable program that provides encoded instructions (e.g., machine code instructions) for processor 1105 to accomplish specific, non-generic, particular computing functions.

After the compiling process, the encoded instructions may then be loaded as computer executable instructions or process steps to processor 1105 from storage device 1120, from memory 1110, and/or embedded within processor 1105 (e.g., via a cache or on-board ROM). Processor 1105 may be configured to execute the stored instructions or process steps in order to perform instructions or process steps to transform the computing device into a non-generic, particular, specially programmed machine or apparatus. Stored data, e.g., data stored by a storage device 1120, may be accessed by processor 1105 during the execution of computer executable instructions or process steps to instruct one or more components within the computing device 1100.

A user interface (e.g., output devices 1115 and input devices 1130) can include a display, positional input device (such as a mouse, touchpad, touchscreen, or the like), keyboard, or other forms of user input and output devices. The user interface components may be communicatively coupled to processor 1105. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 1100 may comprise other components well known in the art, such as sensors, powers sources, and/or analog-to-digital converters, not explicitly shown in FIG. 11.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A wireless networking device comprising:
a first radio communicatively coupled to a wired network communication interface;
a second radio communicatively coupled to the wired network communication interface, the second radio having different operational parameters than the first radio;
a processing device communicatively coupled to the first radio, the second radio, and the wired network communication interface; and
a memory storing instructions, that when executed by the processing device, cause the wireless networking device to:
establish a single data communication channel via the first radio with a remote wireless access point;
receive an indication, at the processing device, that a load balancing is to be initiated across the first radio and the second radio for the single data communication channel, wherein the indication that a load balancing is to be initiated comprises an indication based on detecting a relative position relocation with respect to the remote wireless access point and the wireless networking device; and
adapt receipt of the single data communication channel to be partially received via the first radio and the second radio in parallel, wherein the load balancing is initiated based on an assessment of congestion level and throughput of wireless network links associated with the first radio and the second radio.

2. The wireless networking device of claim 1, wherein the memory further stores instructions, that when executed by the processing device, cause the wireless networking device to:
receive an indication, at the processing device, that a load balancing is to be terminated across the first radio and the second radio for the single data communication channel; and
terminate use of both the first radio and the second radio in parallel to return to use of a single radio for the single data communication channel.

3. The wireless networking device of claim 1, wherein the load balancing is performed for a duration where an active/backup configuration of the first radio and the second radio is not reliable.

4. The wireless network device of claim 3, wherein the duration corresponds to a fluctuation in atmospheric conditions affecting transmission between the wireless networking device and the remote wireless access point.

5. The wireless networking device of claim 1, wherein the indication that a load balancing is to be initiated comprises an indication based on supporting a quality of service for a channel other than the single data communication channel between the remote wireless access point and the wireless networking device.

6. The wireless networking device of claim 1, wherein multiple channels in addition to the single data communication channel are load balanced for transmission between the remote wireless access point and the wireless networking device.

7. A wireless networking device comprising:
a first radio communicatively coupled to a wired network communication interface;
a second radio communicatively coupled to the wired network communication interface, the second radio having different operational parameters than the first radio;
a processing device communicatively coupled to the first radio, the second radio, and the wired network communication interface; and
a memory storing instructions, that when executed by the processing device, cause the wireless networking device to:
establish a single data communication channel via the first radio with a remote wireless access point;
determine throughput of communication has been affected by an impact condition causing communication via the first radio to be impacted negatively and the second radio impacted positively such that the first radio experiences a first level of communication degradation while the second radio experiences a second level of communication degradation lesser than the first level, wherein the impact to the first radio is caused, in part, by a relative location repositioning between the wireless device and the remote wireless access point;
transition receipt of the single data communication channel to be received via the second radio; and
alter the first radio to backup status concurrently with altering the second radio to active status for the single data communication channel.

8. The wireless networking device of claim 7, wherein the impact to the first radio is caused, in part, by atmospheric condition changes.

9. The wireless networking device of claim 7, wherein the impact to the first radio is caused by a suspended link.

10. The wireless networking device of claim 7, wherein the memory further stores instructions, that when executed by the processing device, cause the wireless networking device to:
detect that the impact condition has been alleviated;

transition receipt of the single data communication channel to be received via the first radio; and alter the second radio to backup status concurrently with altering the first radio to active status for the single data communication channel.

11. The wireless networking device of claim 10, wherein the memory further stores instructions, that when executed by the processing device, cause the wireless networking device to:

receive an indication, at the processing device, that a load balancing is to be initiated across the first radio and the second radio for the single data communication channel; and adapt receipt of the single data communication channel to be partially received via the first radio and the second radio in parallel, wherein the load balancing is initiated based on an assessment of congestion level and throughput of wireless network links associated with the first radio and the second radio.

12. The wireless networking device of claim 7, wherein the memory further stores instructions, that when executed by the processing device, cause the wireless networking device to:

receive an indication, at the processing device, that a load balancing is to be initiated across the first radio and the second radio for the single data communication channel; and adapt receipt of the single data communication channel to be partially received via the first radio and the second radio in parallel, wherein the load balancing is initiated based on an assessment of the congestion level and throughput of wireless network links associated with the first radio and the second radio.

13. The wireless networking device of claim 12, wherein the wireless network device:

alternates between the load balancing across the first radio and the second radio; and an active/backup configuration for the first and second radio with respect to processing the single data communication channel.

14. A non-transitory computer readable medium storing instructions, that when executed by a processing device coupled to a wireless networking device, cause the wireless networking device to:

establish a single data communication channel via a first radio of the wireless networking device with a remote wireless access point;

determine throughput of communication has been affected by an impact condition causing communication via the first radio to be impacted negatively and a second radio of the wireless networking device to be impacted positively such that the first radio experiences a first level of communication degradation while the second radio experiences a second level of communication degradation lesser than the first level, the second radio having different operational characteristics than the first radio, wherein the impact to the first radio is caused, in part, by a relative location repositioning between the wireless device and the remote wireless access point;

transition receipt of the single data communication channel to be received via the second radio; and alter the first radio to backup status concurrently with altering the second radio to active status for the single data communication channel.

15. The non-transitory computer readable medium of claim 14, further storing instructions, that when executed by the processing device, cause the wireless networking device to:

detect that the impact condition has been alleviated;

transition receipt of the single data communication channel to be received via the first radio; and alter the second radio to backup status concurrently with altering the first radio to active status for the single data communication channel.

16. The non-transitory computer readable medium of claim 14, further storing instructions, that when executed by the processing device, cause the wireless networking device to:

receive an indication, at the processing device, that a load balancing is to be initiated across the first radio and the second radio for the single data communication channel; and adapt receipt of the single data communication channel to be partially received via the first radio and the second radio in parallel, wherein the load balancing is initiated based on an assessment of congestion level and throughput of wireless network links associated with the first radio and the second radio.

17. The non-transitory computer readable medium of claim 16, wherein the instructions cause the wireless network device to:

alternate between the load balancing across the first radio and the second radio; and an active/backup configuration for the first and second radio with respect to processing the single data communication channel.

* * * * *